United States Patent

[11] 3,614,031

| [72] | Inventor | Henry Demboski<br>5302 N. Washington Blvd., Arlington, Va. 22205 |
|---|---|---|
| [21] | Appl. No. | 27,095 |
| [22] | Filed | Apr. 9, 1970 |
| [45] | Patented | Oct. 19, 1971 |

[54] BALLOON DESTRUCT DESCENT AND RECOVERY SYSTEM
7 Claims, 7 Drawing Figs.

[52] U.S. Cl. .................................................. 244/32, 244/138
[51] Int. Cl. .................................................. B64b 1/48
[50] Field of Search .................................... 244/32, 138, 33, 147, 149, 152, 127, 31

[56] References Cited
UNITED STATES PATENTS

| 2,444,642 | 7/1948 | Frieder et al. ................. | 244/32 |
| 2,793,824 | 5/1957 | D'ooge ......................... | 244/32 |
| 2,302,906 | 2/1967 | Winker ......................... | 244/32 |

*Primary Examiner*—Milton Buchler
*Assistant Examiner*—C. A. Rutledge
*Attorneys*—Richard J. Miller and R. S. Sciascia

ABSTRACT: A structure for recovering the instrument package of a high-altitude balloon by providing means for destroying a portion of the balloon, inverting the balloon and allowing the escaping gas to provide a controlled descent until such time as the balloon is deflated and a parachute then provides a means for returning the entire package to the earth.

PATENTED OCT 19 1971

HENRY DEMBOSKI
INVENTOR.

BY Richard J. Miller
Attorney

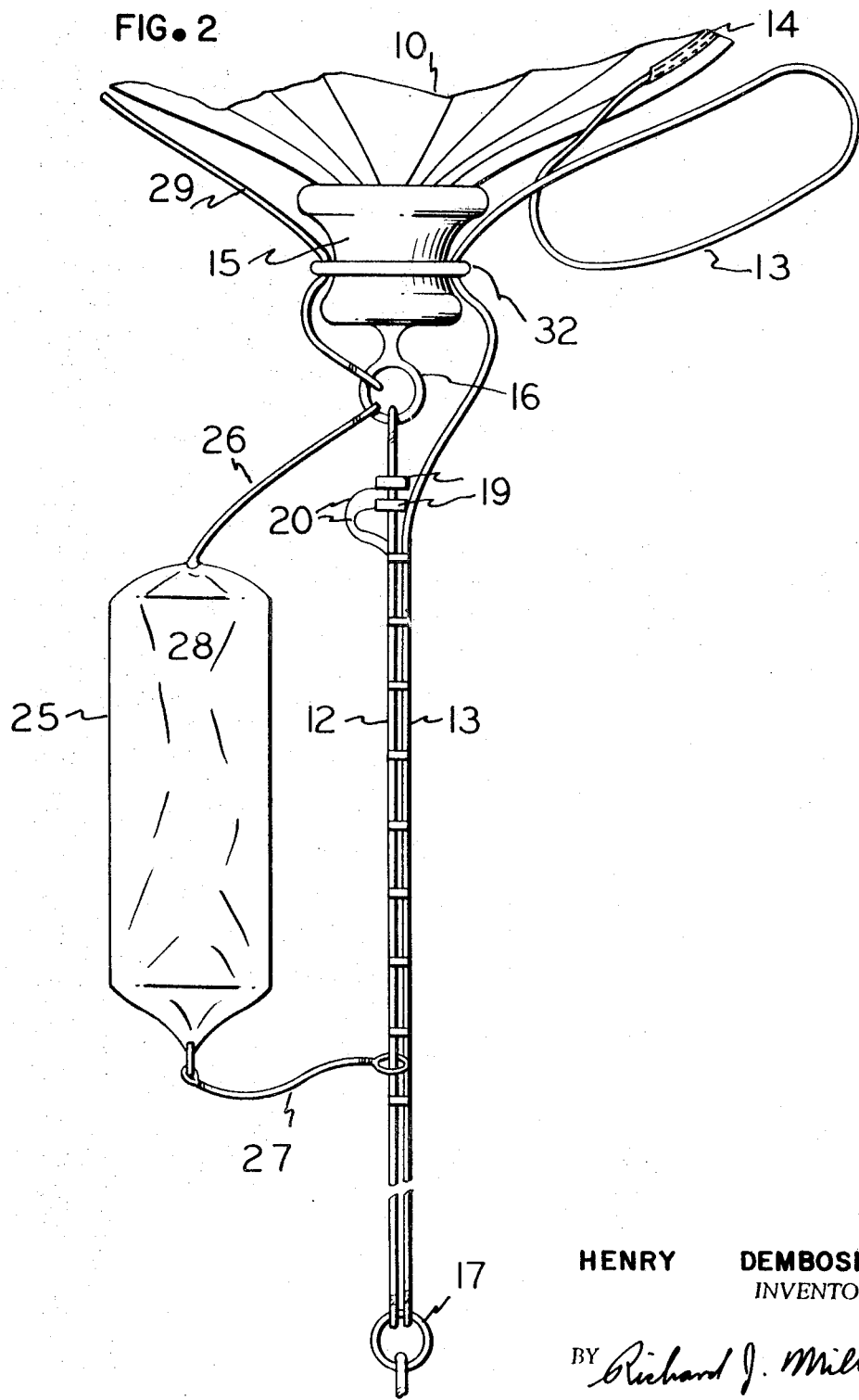

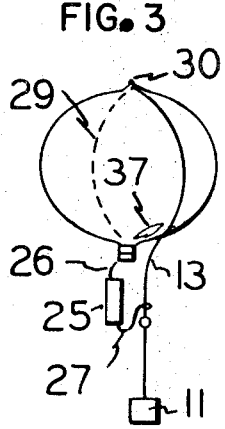
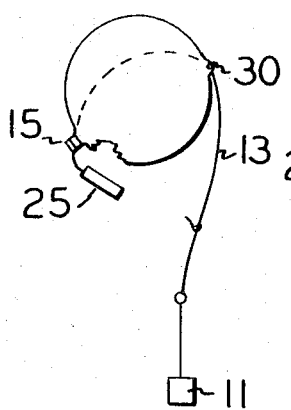
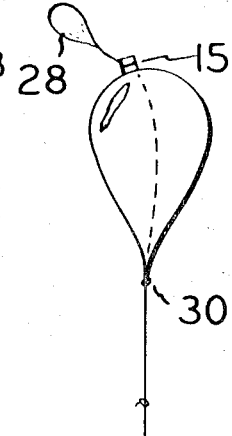
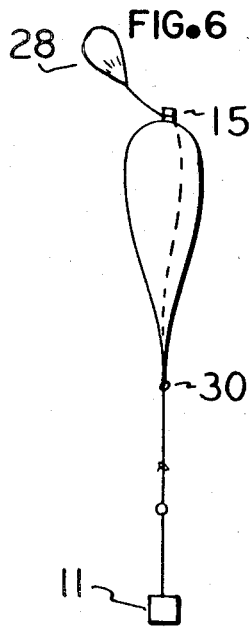
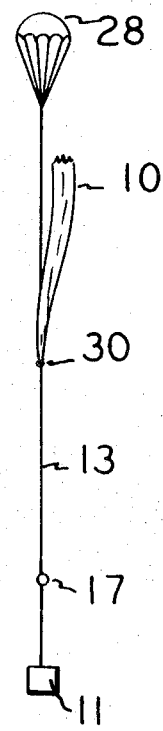
HENRY DEMBOSKI
*INVENTOR.*

3,614,031

BALLOON DESTRUCT DESCENT AND RECOVERY SYSTEM

The invention described herein may be manufactured and used by or for the Government of The United States of America for governmental purposes without the payment of any royalties thereon or therefor.

High altitude ballooning is useful for making scientific measurements and observations of certain phenomena. This is accomplished by providing balloons which are partially filled on the ground and as they rise in altitude the gas therein expands and causes the balloon to completely inflate. This process allows for the placement of a scientific package at any of several desirous float altitudes and the current state of the art limits provide balloons in the neighborhood of $30 \times 10^6$ cubic feet and a float altitude of 130 to 140,000 feet.

These flights have varying periods of duration and upon completion of the desired scientific observations the instrument package is generally returned to earth for the purpose of reuse and of obtaining the data therein. It is generally the practice to separate the instrument package from the balloon to allow the package to descend under a parachute and the balloon is allowed to rise to the point where it will burst and descend in pieces. Occasionally balloons do not burst and become derelicts floating in the air that become a hazard to aircraft. It is also possible that the balloon package or skin may descend in an undesired place and cause undesired damage due to its place of descent.

It is therefore an object of this invention to provide an improved balloon destruct and descent system for recovery of instrument packages.

It is yet a further object of this invention to provide an improved method for recovering the balloon and instrument package upon termination of a scientific flight.

It is still a further object of the invention to provide an improved balloon descent system wherein the balloon is inverted, a portion of the skin destroyed, and the descent controlled due to the escape of gas until such time as a parachute takes over for the balance of the flight.

Another object of the invention is to provide a high-altitude balloon destruct and descent system, comprising: a high-altitude balloon, an instrument package for performing scientific observations and experiments, means for coupling the instrument package to the top of the balloon, a portion of which is affixed to a lower part of the balloon, means for fastening the coupling means to the bottom of the balloon so that during the ascent and float stages the instrument package is suspended below the balloon, parachute means are coupled to the instrument package, means coupled to the instrument for uncoupling the lower holding means so that the instrument package causes the balloon to rotate and to destroy a portion of the balloon so that the lifting gas may escape from the bottom portion of the balloon and upon rotation of the balloon-lifting gas escapes, the balloon begins to deflate and the entire system descends.

A still further object of this invention is to provide a high-altitude balloon destruct and descent system, comprising: a high-altitude balloon having upper and lower fittings at the top and bottom of the balloon; an instrument package for performing scientific observations and experiments; a first means for coupling the instrument package to the upper fitting of the balloon; a second means for coupling the instrument package to the lower fitting of the balloon so that during the ascent and float state the instrument package is suspended below the balloon; a parachute means coupled to the instrument package and the balloon; and a third means coupled to said instrument package for uncoupling the second means coupling the instrument package below the balloon so that the weight of the package rotates the balloon to an inverted position, and a parachute means is disposed upon the rotation to open as the balloon and instrument package descend.

Other objects, advantages and novel features of the invention will become apparent from the following detailed description of the invention when considered in conjunction with the accompanying drawings wherein:

FIG. 2 is a detailed view between lines 2—2 in FIG. 1 showing the parachute package coupled between the instrument package and the balloon and the details of the lower portion of the balloon;

FIG. 3 shows the balloon after the instrument package is detached from its initial connection to the bottom of the balloon;

FIG. 4 shows the balloon being rotated by the weight of the instrument package;

FIG. 5 shows the balloon in the substantially inverted position;

FIG. 6 shows the balloon completely inverted and partially deflated; and

FIG. 7 shows the balloon completely deflated and the parachute supporting both the instrument package and the deflated balloon.

Figure 1:
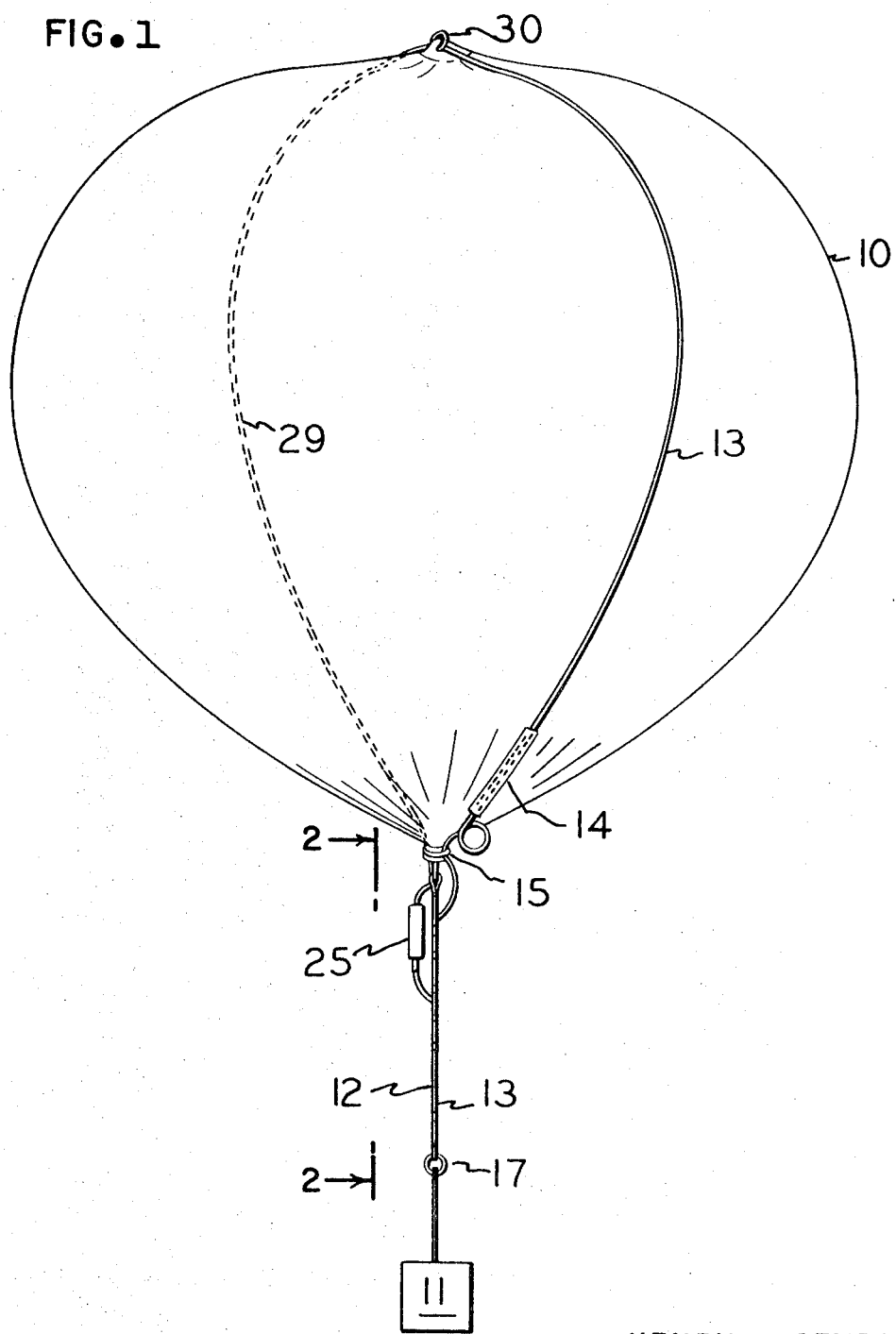
FIG. 1 shows a fully inflated balloon in the float stage of a flight having an instrument package attached thereto.

Referring now more specifically to the figures, a balloon 10 is shown coupled to an instrument package 11 by connecting line 12. In FIG. 1 the balloon 10 is shown in the fully inflated position where the instrument package is supported at a desired float altitude for performing whatever scientific experimentation it is designed. A first means or line 13 is shown coupled to the instrument package 11 and a portion 14 of line 13 is affixed to the skin of the balloon to provide for ripping a hole in the balloon at a desired time.

In FIG. 2 the bottom portion of the balloon 10 is shown connected to a lower balloon fitting 15 which has an eyebolt 16. Line 12 is connected to the eyebolt and to a ring 17 to which the instrument package is attached. A pair of destruct-explosive devices 19, coupled by a pair of wires 20 to the instrument package are for destroying line 12 upon command. A parachute container 25 is shown coupled by a pair of lines 26, 27 to the ring 16 and line 12. In the position shown in FIG. 2 a parachute 28 is stored in parachute container 25 for subsequent use. A line 29 is shown connecting the lower fitting 15 to an upper balloon fitting 30 to provide a positive connection between parachute 28 and instrument package 11.

A weak fastening means 32 is shown holding line 13 to the bottom fixture 15 for convenience during the ascent and float stages.

Assuming that the scientific flight has accomplished its purpose and it is time to terminate the flight, a command signal is given which will fire cannon squibs 19 by an electrical impulse through wires 20 causing a separation of line 12. The weight of the scientific package 11 is then transferred to line 13, and the fastening means 32 is destroyed so that the entire weight of the instrument package is on the line 13. The extra loop in line 13 allows for an initial descent of package 11 and the breaking of weak fastening means 32.

The portion 14 of the line attached to the balloon will then commence to rip and, as shown in FIG. 3, a portion of the balloon is torn out to provide a hole. It can be seen from the FIGS. 3, 4, 5, 6 and 7 that with the weight of the instrument package 11, supported on line 13, the balloon will rotate. Line 27, connecting the parachute package 25 to the line 12 is freed at this point, since line 12 no longer has integrity the parachute package 25 is rotated along with the balloon. As the balloon rotates the hole 37 in the balloon is positioned in the upper end of the inverted balloon, as shown in FIG. 5, and the lifting gas escapes at an increasing rate.

The parachute package is now free and the parachute 28 can be seen to deploy in FIGS. 5 and 6. In FIG. 7 the balloon is entirely deflated, the parachute 28 is completely deployed and the instrument package is descending to the ground under controlled conditions. Thus, it is possible to recover the payload without damage and to control the descent of the balloon so that it is not a hazard to navigation of airplanes, nor is it a hazard to people and property on the ground since normally the balloons are descended in nonpopulated areas.

Obviously many modifications and variations of the present invention are possible in the light of the above teachings. It is therefore to be understood that within the scope of the appended claims the invention may be practiced otherwise than as specifically described.

I claim:

1. A high-altitude balloon destruct and descent system, comprising:
   a. a high-altitude balloon having upper and lower fittings at the top and bottom of said balloon;
   b. an instrument package for performing scientific observations and experiments;
   c. first means for coupling the instrument package to said upper fittings of said balloon;
   d. second means for coupling said instrument package to said lower fitting of said balloon so that during the ascent and float stages, said instrument package is suspended below said balloon;
   e. parachute means coupled to said instrument package and said balloon; and
   f. third means coupled to said instrument package for uncoupling said second means coupling the instrument package below said balloon so that the weight of said package rotates the balloon to an inverted position, said parachute means being disposed upon said rotation to open as said balloon and instrument package descends.

2. The system of claim 1 wherein said first and second coupling means are affixed to each other in a severable relationship below said lower fitting.

3. The system of claim 2 wherein said uncoupling means is affixed between said lower fitting and said affixed portions of said first and second coupling means.

4. The system of claim 1 wherein said parachute means is coupled to said lower fitting and said second means for coupling the instrument package.

5. The system of claim 4 wherein a line is provided directly connecting said lower and upper fitting so that a positive connection exists therebetween in the event that the balloon skin is not strong enough to support the instrument package on descent.

6. The system of claim 5 wherein there is provided a positive connection between said first coupling means and a portion of said balloon so that upon rotation of said balloon a hole is provided near said lower fitting to allow for the escape of lifting gas.

7. The system of claim 6 wherein said uncoupling means includes an explosive charge positioned about said means for coupling said instrument package electrically connected to said instrument package so that the descent phase of the balloon flight may be initiated upon command from said instrument package.